United States Patent
Watson et al.

(10) Patent No.: US 12,175,078 B2
(45) Date of Patent: Dec. 24, 2024

(54) VIRTUAL CONTAINER STORAGE INTERFACE CONTROLLER

(71) Applicant: Dell Products L.P., Round Rock, TX (US)

(72) Inventors: Thomas L. Watson, Richardson, TX (US); Prakash Venkatanarayanan, Framingham, MA (US)

(73) Assignee: Dell Products L.P., Round Rock, TX (US)

( * ) Notice: Subject to any disclaimer, the term of this patent is extended or adjusted under 35 U.S.C. 154(b) by 8 days.

(21) Appl. No.: 17/970,676

(22) Filed: Oct. 21, 2022

(65) Prior Publication Data
US 2024/0134526 A1 Apr. 25, 2024
US 2024/0231620 A9 Jul. 11, 2024

(51) Int. Cl.
*G06F 3/06* (2006.01)
*G06F 9/455* (2018.01)

(52) U.S. Cl.
CPC ............ *G06F 3/061* (2013.01); *G06F 3/0629* (2013.01); *G06F 3/0673* (2013.01); *G06F 9/45558* (2013.01); *G06F 2009/45579* (2013.01); *G06F 2009/45583* (2013.01)

(58) Field of Classification Search
None
See application file for complete search history.

(56) References Cited

U.S. PATENT DOCUMENTS

| 2006/0271758 | A1* | 11/2006 | Innan | G06F 3/061 711/170 |
| 2007/0245116 | A1* | 10/2007 | Yamamoto | G06F 3/0608 711/172 |
| 2022/0276929 | A1 | 9/2022 | Prashant et al. | |
| 2022/0308849 | A1 | 9/2022 | Kumar et al. | |

OTHER PUBLICATIONS

Github, "Dell Container Storage Modules (CSM)" https://github.com/dell/csm, Accessed Aug. 8, 2022, 3 pages.
N. Yehia, "Kubernetes Self Remediation (AKA Poison Pill)," https://www.openshift.com/blog/kubernetes-self-remediation-aka-poison-pill, Nov. 18, 2020, 4 pages.
(Continued)

*Primary Examiner* — Charles J Choi
(74) *Attorney, Agent, or Firm* — Ryan, Mason & Lewis, LLP

(57) ABSTRACT

Techniques for container environment management are disclosed. For example, a method manages, via a virtual container storage interface controller, a generic mapping for one or more container storage attributes for a set of storage specific container storage interface drivers respectively associated with a set of storage arrays of a storage system so as to isolate an application program, executing on a host device accessing one or more storage volumes stored on the set of storage arrays, from the set of storage specific container storage interface drivers. For example, the isolation can provide a layer of abstraction for application specific handles from the actual underlying storage and then enable use of the abstraction to provide services such as, but not limited to, seamless data mobility.

20 Claims, 10 Drawing Sheets

(56) References Cited

OTHER PUBLICATIONS

N. Yehia, "Poison Pill k8s Node Remediation," https://github.com/poison-pill/poison-pill, Dec. 30, 2020, 2 pages.
Github, "HPE CSI Driver for Kubernetes," https://github.com/hpe-storage/csi-driver, accessed Feb. 4, 2021, 3 pages.
Github, "Stork—Storage Operator Runtime for Kubernetes," https://github.com/libopenstorage/stork, accessed Feb. 4, 2021, 8 pages.
G. Saenger et al., "Pod Safety, Consistency Guarantees, and Storage Implications,"https://github.com/kubernetes/community/blob/master/contributors/design-proposals/storage/pod-safety.md, Oct. 2016, 10 pages.

* cited by examiner

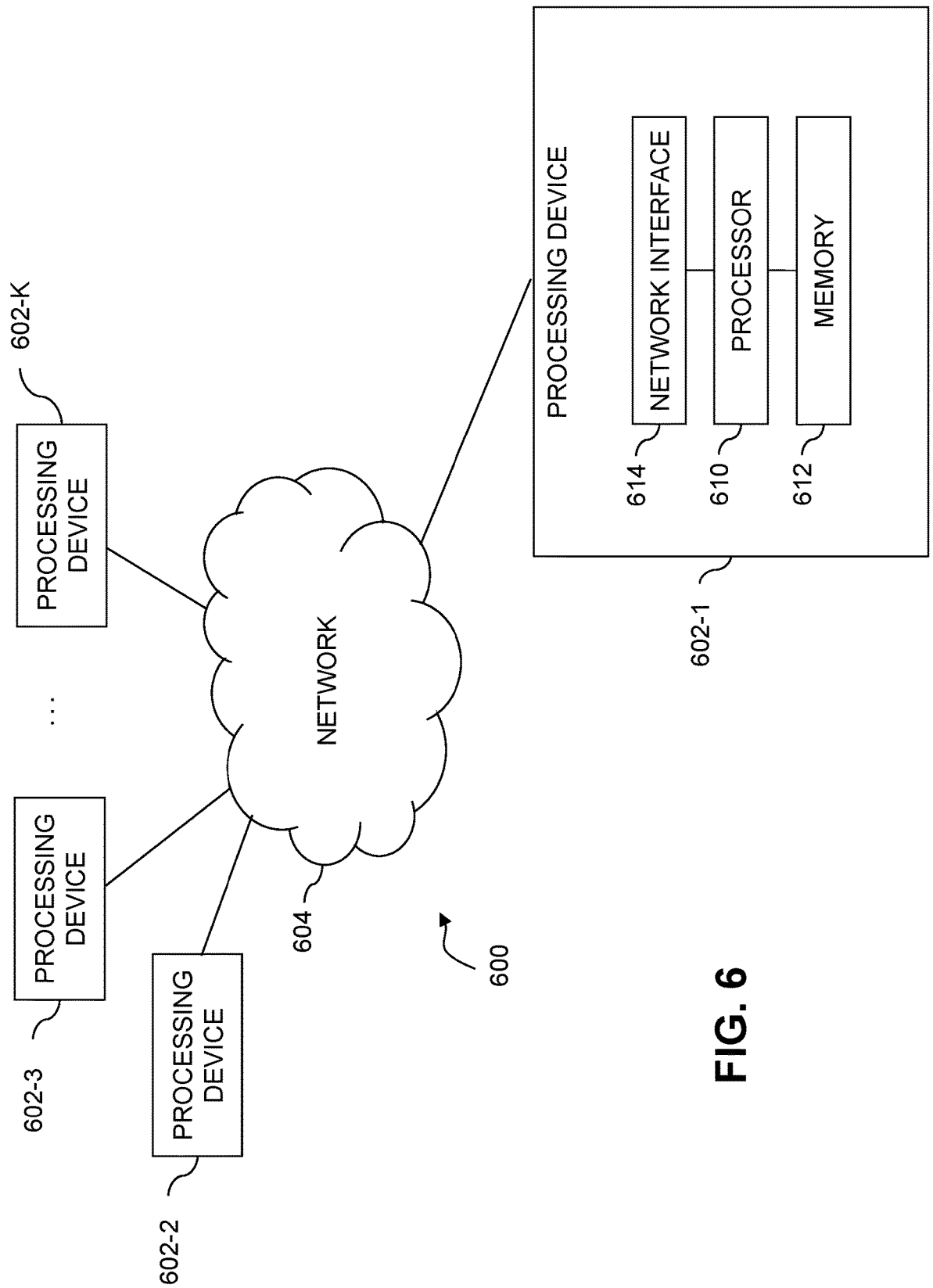

VIRTUAL CONTAINER STORAGE INTERFACE CONTROLLER

FIELD

The field relates generally to information processing systems, and more particularly to management of container environments.

BACKGROUND

Information processing systems increasingly utilize reconfigurable virtual resources to meet changing user needs in an efficient, flexible and cost-effective manner. For example, computing and storage systems implemented using virtual resources in the form of containers have been widely adopted. Such containers may be used to provide at least a portion of the virtualization infrastructure of a given information processing system. However, significant challenges arise in managing container environments especially in the case of disparate storage environments with a variety of storage array types, each possibly having their own unique interface and semantics.

SUMMARY

Illustrative embodiments provide techniques for managing containers in disparate storage environments.

For example, in an illustrative embodiment, a method comprises managing, via a virtual container storage interface controller, a generic mapping for one or more container storage attributes for a set of storage specific container storage interface drivers respectively associated with a set of storage arrays of a storage system so as to isolate an application program, executing on a host device accessing one or more storage volumes stored on the set of storage arrays, from the set of storage specific container storage interface drivers.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

Advantageously, the isolation according to one or more illustrative embodiments can provide a layer of abstraction for application specific handles from the actual underlying storage and then enable use of the abstraction to provide services such as, but not limited to, seamless data mobility. Further, illustrative embodiments enable, inter alia, virtualization of disparate physical storage array types that can be remapped while the storage is in use, facilitating migration or copying across different storage arrays. In one or more illustrative embodiments, a containerized workload is executed as a pod on a given node of the container environment. While such container management techniques are particularly effective in pod-based container environments, it is to be appreciated that the techniques can be implemented in other container environments.

These and other illustrative embodiments include, without limitation, apparatus, systems, methods and computer program products comprising processor-readable storage media.

BRIEF DESCRIPTION OF THE DRAWINGS

FIGS. 5 and 6 show examples of processing platforms that may be utilized to implement at least a portion of an information processing system with a virtual container storage interface driver architecture according to an illustrative embodiment.

DETAILED DESCRIPTION

Figure 1:
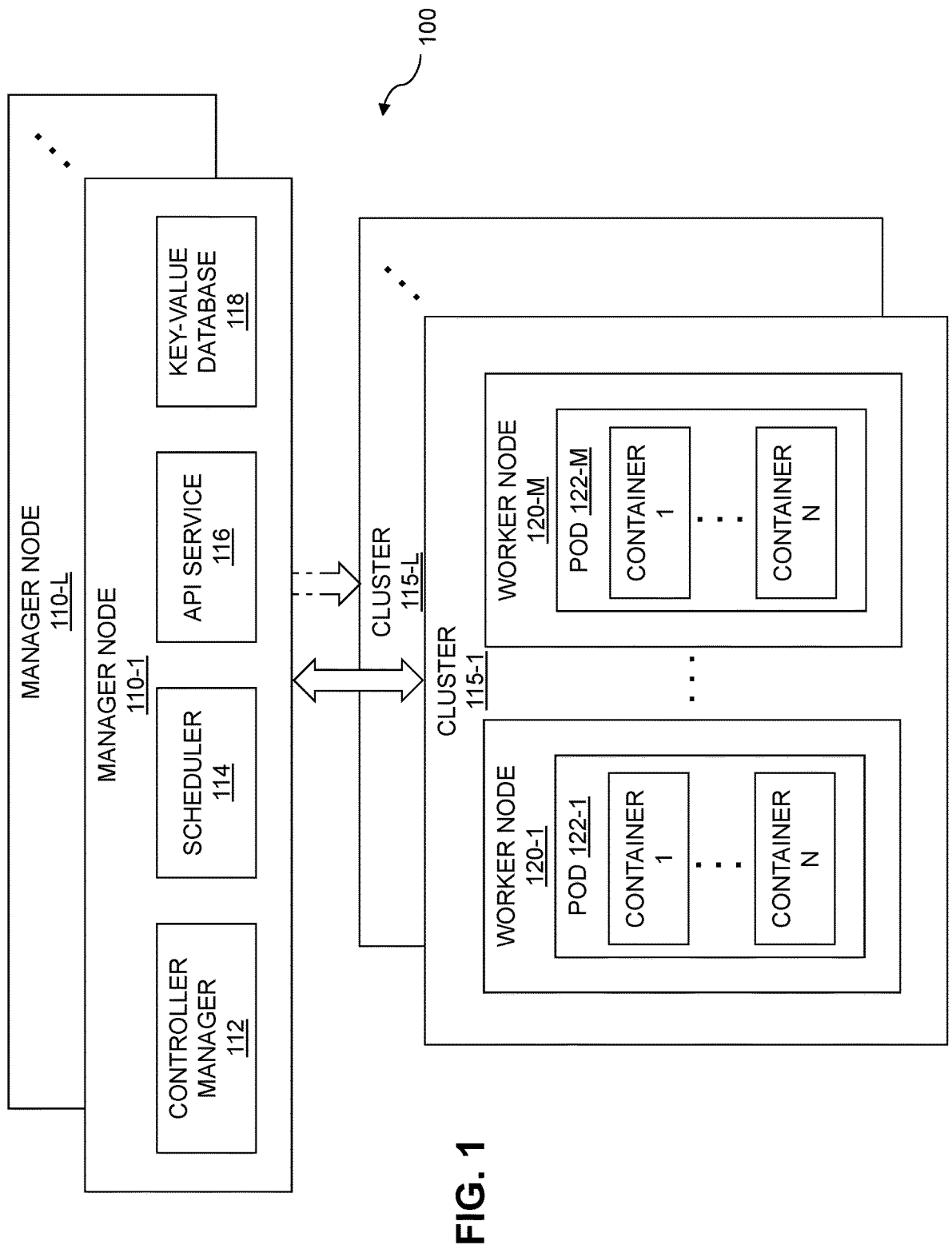
FIG. 1 illustrates a pod-based container environment within which one or more illustrative embodiments can be implemented.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing platforms comprising cloud and/or non-cloud computing and storage systems, as well as other types of processing systems comprising various combinations of physical and/or virtual processing resources. An information processing system may therefore comprise, by way of example only, at least one data center or other type of cloud-based system that includes one or more clouds hosting tenants that access cloud resources.

As the term is illustratively used herein, a container may be considered lightweight, stand-alone, executable software code that includes elements needed to run the software code. The container structure has many advantages including, but not limited to, isolating the software code from its surroundings, and helping reduce conflicts between different tenants or users running different software code on the same underlying infrastructure. The term "user" herein is intended to be broadly construed so as to encompass numerous arrangements of human, hardware, software or firmware entities, as well as combinations of such entities.

In illustrative embodiments, containers may be implemented using a Kubernetes container orchestration system. Kubernetes is an open-source system for automating application deployment, scaling, and management within a container-based information processing system comprised of components referred to as pods, nodes and clusters, as will be further explained below in the context of FIG. 1. Types of containers that may be implemented or otherwise adapted within the Kubernetes system include, but are not limited to, Docker containers or other types of Linux containers (LXCs) or Windows containers. Kubernetes has become the prevalent container orchestration system for managing containerized workloads. It is rapidly being adopted by many enterprise-based information technology (IT) organizations to deploy its application programs (applications). By way of example only, such applications may include stateless (or inherently redundant applications) and/or stateful applications. Non-limiting examples of stateful applications may include legacy databases such as Oracle, MySQL, and PostgreSQL, as well as other stateful applications that are not inherently redundant. While the Kubernetes container orchestration system is used to illustrate various embodiments, it is to be understood that alternative container orchestration systems can be utilized.

Some terminology associated with the Kubernetes container orchestration system will now be explained. In general, for a Kubernetes environment, one or more containers are part of a pod. Thus, the environment may be referred to, more generally, as a pod-based system, a pod-based container system, a pod-based container orchestration system, a pod-based container management system, or the like. As mentioned above, the containers can be any type of container, e.g., Docker container, etc. Furthermore, a pod is typically considered the smallest execution unit in the Kubernetes container orchestration environment. A pod encapsulates one or more containers. One or more pods are executed on a worker node. Multiple worker nodes form a cluster. A Kubernetes cluster is managed by a least one manager node. A Kubernetes environment may include multiple clusters respectively managed by multiple manager nodes. Furthermore, pods typically represent the respective processes running on a cluster. A pod may be configured as a single process wherein one or more containers execute one or more functions that operate together to implement the process. Pods may each have a unique Internet Protocol (IP) address enabling pods to communicate with one another, and for other system components to communicate with each pod. Still further, pods may each have persistent storage volumes associated therewith. Configuration information (configuration objects) indicating how a container executes can be specified for each pod.

FIG. 1 depicts an example of a pod-based container orchestration environment 100. As shown, a plurality of manager nodes 110-1, . . . 110-L (herein each individually referred to as manager node 110 or collectively as manager nodes 110) are respectively operatively coupled to a plurality of clusters 115-1, . . . 115-L (herein each individually referred to as cluster 115 or collectively as clusters 115). As mentioned above, each cluster is managed by at least one manager node.

Each cluster 115 comprises a plurality of worker nodes 120-1, . . . 120-M (herein each individually referred to as worker node 120 or collectively as worker nodes 120). Each worker node 120 comprises a respective pod, i.e., one of a plurality of pods 122-1, . . . 122-M (herein each individually referred to as pod 122 or collectively as pods 122). However, it is to be understood that one or more worker nodes 120 can run multiple pods 122 at a time. Each pod 122 comprises a set of containers 1, N (each pod may also have a different number of containers). As used herein, a pod may be referred to more generally as a containerized workload. Also shown in FIG. 1, each manager node 110 comprises a controller manager 112, a scheduler 114, an application programming interface (API) service 116, and a key-value database 118, as will be further explained. However, in some embodiments, multiple manager nodes 110 may share one or more of the same controller manager 112, scheduler 114, API service 116, and key-value database 118.

Worker nodes 120 of each cluster 115 execute one or more applications associated with pods 122 (containerized workloads). Each manager node 110 manages the worker nodes 120, and therefore pods 122 and containers, in its corresponding cluster 115. More particularly, each manager node 110 controls operations in its corresponding cluster 115 utilizing the above-mentioned components, i.e., controller manager 112, scheduler 114, API service 116, and a key-value database 118. In general, controller manager 112 executes control processes (controllers) that are used to manage operations in cluster 115. Scheduler 114 typically schedules pods to run on particular nodes taking into account node resources and application execution requirements such as, but not limited to, deadlines. In general, in a Kubernetes implementation, API service 116 exposes the Kubernetes API, which is the front end of the Kubernetes container orchestration system. Key-value database 118 typically provides key-value storage for all cluster data including, but not limited to, configuration data objects generated, modified, deleted, and otherwise managed, during the course of system operations.

Figure 2:
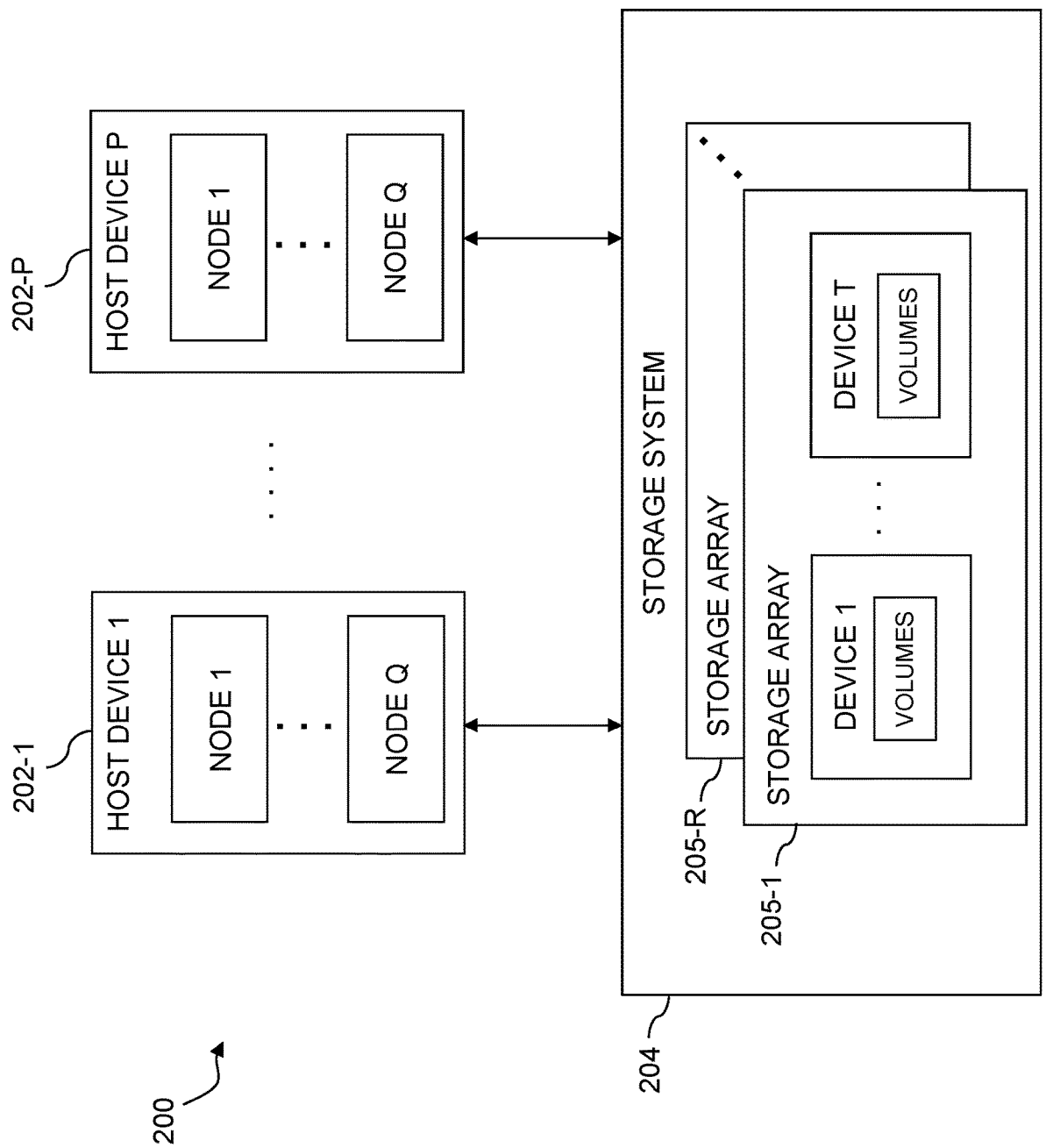
FIG. 2 illustrates host devices and a storage system within which one or more illustrative embodiments can be implemented.

Turning now to FIG. 2, an information processing system 200 is depicted within which pod-based container orchestration environment 100 of FIG. 1 can be implemented. More particularly, as shown in FIG. 2, a plurality of host devices 202-1, . . . 202-P (herein each individually referred to as host device 202 or collectively as host devices 202) are operatively coupled to a storage system 204. Each host device 202 hosts a set of nodes 1, . . . Q. One non-limiting example of a host device 202 is a server. Note that while multiple nodes are illustrated on each host device 202, a host device 202 can host a single node, and one or more host devices 202 can host a different number of nodes as compared with one or more other host devices 202.

As further shown in FIG. 2, storage system 204 comprises a plurality of storage arrays 205-1, . . . 205-R (herein each individually referred to as storage array 205 or collectively as storage arrays 205), each of which is comprised of a set of storage devices 1, T upon which one or more storage volumes are persisted. The storage volumes depicted in the storage devices of each storage array 205 can include any data generated in the information processing system 200 but, more typically, include data generated, manipulated, or otherwise accessed, during the execution of one or more applications in the nodes of host devices 202.

Furthermore, any one of nodes 1, . . . . Q on a given host device 202 can be a manager node 110 or a worker node 120 (FIG. 1). In some embodiments, a node can be configured as a manager node for one execution environment and as a worker node for another execution environment. Thus, the components of pod-based container orchestration environment 100 in FIG. 1 can be implemented on one or more of host devices 202, such that data associated with pods 122 (FIG. 1) running on the nodes 1, . . . . Q is stored as persistent storage volumes in one or more of the storage devices 1, . . . . T of one or more of storage arrays 205.

Host devices 202 and storage system 204 of information processing system 200 are assumed to be implemented using at least one processing platform comprising one or more processing devices each having a processor coupled to a memory. Such processing devices can illustratively include particular arrangements of compute, storage and network resources. In some alternative embodiments, one or more host devices 202 and storage system 204 can be implemented on respective distinct processing platforms.

The term "processing platform" as used herein is intended to be broadly construed so as to encompass, by way of illustration and without limitation, multiple sets of processing devices and associated storage systems that are configured to communicate over one or more networks. For example, distributed implementations of information processing system 200 are possible, in which certain components of the system reside in one data center in a first geographic location while other components of the system reside in one or more other data centers in one or more other geographic locations that are potentially remote from the first geographic location. Thus, it is possible in some implementations of information processing system 200 for portions or components thereof to reside in different data centers. Numerous other distributed implementations of information processing system 200 are possible. Accordingly, the constituent parts of information processing system 200 can also be implemented in a distributed manner across multiple computing platforms.

Additional examples of processing platforms utilized to implement containers, container environments and container management systems in illustrative embodiments, such as those depicted in FIGS. 1 and 2, will be described in more detail below in conjunction with FIGS. 5 and 6.

It is to be appreciated that these and other features of illustrative embodiments are presented by way of example only, and should not be construed as limiting in any way.

Accordingly, different numbers, types and arrangements of system components can be used in other embodiments. Although FIG. 2 shows an arrangement wherein host devices 202 are coupled to just one plurality of storage arrays 205, in other embodiments, host devices 202 may be coupled to and configured for operation with storage arrays across multiple storage systems similar to storage system 204.

It is also to be understood that different ones of storage arrays 205 can be configured with different interfaces and/or different semantics and can store different data types (e.g., blocks, files, objects, etc.) Storage arrays 205 can also be different storage products (storage families, storage platforms) of one or more different storage vendors.

It should be understood that the particular sets of components implemented in information processing system 200 as illustrated in FIG. 2 are presented by way of example only. In other embodiments, only subsets of these components, or additional or alternative sets of components, may be used, and such components may exhibit alternative functionality and configurations. Additional examples of systems implementing pod-based container management functionality will be described below.

Still further, information processing system 200 may be part of a public cloud infrastructure such as, but not limited to, Amazon Web Services (AWS), Google Cloud Platform (GCP), Microsoft Azure, etc. The cloud infrastructure may also include one or more private clouds and/or one or more hybrid clouds (e.g., a hybrid cloud is a combination of one or more private clouds and one or more public clouds). Portions of information processing system 200 may also be part of one or more edge computing platforms.

It is realized herein that within container orchestration environments, such as the pod-based environment of Kubernetes, stateful applications are deployed on top of persistent storage volumes which are typically provisioned by Container Storage Interface (CSI) plugins of respective external storage system vendors (e.g. one or more third-party providers of components of storage system 204). A CSI plugin is typically deployed in Kubernetes as a set of components deployable on any or all nodes (e.g., manager node 110 or worker node 120) and comprises a CSI driver component (CSI driver) and one or more sidecar containers (sidecars). Sidecars typically interact with Kubernetes objects and make calls to the CSI driver to manage Kubernetes events. Sidecars typically include functions such as, but not limited to, an external-provisioner, an external-attacher, an external-snapshotter, and an external-resizer.

CSI plugins are configured to handle block and file data types in the pod-based environment of Kubernetes. However, CSI plugins do not necessarily handle object storage. As a result, Container Object Storage Interface (COSI) was developed as a standard for exposing object storage to containerized workloads running in Kubernetes.

Further, Kubernetes environments have been adapted to operate with Container Storage Modules (CSMs) which are a set of technologies that extend the capabilities of CSI plugins, improving the observability, resiliency, protection, usability, and data mobility for applications which leverage a given vendors storage portfolio. In general, CSMs extend enterprise storage capabilities to the Kubernetes environment. They also reduce management complexity so that developers can consume storage in an independent manner with ease, and can even automate their daily operations such as provisioning, snapshotting, and replication. Additionally, CSM is open-source and freely available.

An overall goal of our CSI plugins and CSM modules is to make capabilities of storage arrays available to Kubernetes applications, while facilitating the Kubernetes provisioning models that automatically deploy infrastructure (including storage) based on application profiles and storage requirements expressed as code by the application developers. This enables greater efficiency and a broader range of capabilities while still allowing automated storage provisioning.

One problem with the current approach is that the provisioning is still generally storage array type specific, because of the differences in interfaces and semantics of different storage arrays. This causes technical challenges in areas such as moving data between different storage array types or to cloud service providers, as well as requiring higher overhead in terms of the number of containers managing the storage. This also makes provisioning more complex for Kubernetes application developers who do not want to have to consider the details and peculiarities of each different type of storage array.

By way of example only, consider Dell Technologies' storage array PowerStore which has a specific CSI plugin which exposes the required array specific functions such as storage provisioning, replication and snapshotting to Kubernetes. This PowerStore CSI plugin differs from the CSI plugin for Dell Technologies' storage array PowerFlex which uses a different snapshot technology, has different replication capabilities and restrictions, and does not natively support volume clones.

Currently, an information processing system cannot provide intelligent volume placement that selects what type of storage platform to use because the Kubernetes storage class object contains a reference to a provisioner (which is the CSI driver), and if that provisioner only supports a single type of storage array, the selections are limited to that single array's storage pools and facilities.

When an application is configured to run on a PowerStore specific CSI and when the system wants to copy or migrate the application, say from PowerStore to PowerFlex storage, there is always an application re-configuration step required to configure the application to reference new persistent volumes (PVs) from the new target storage array, because the old PVs reference the old storage array. This reconfiguration requires a restart of the pods within the application to reference new persistent volume claims (PVCs) and PVs. PVCs are storage requests that enable developers to dynamically request storage resources without being aware of the implementation of underlying storage devices.

Illustrative embodiments overcome the above and other technical challenges associated with existing container storage interface approaches by providing a hierarchical container storage module that exposes container storage interfaces (e.g., CSI and COSI) for a virtual storage system, providing a layer of abstraction and storage array independence, to storage consumers, that enables delivery of a variety of features including, but not limited to, data mobility, data protection, data availability, and automated storage pools.

More particularly, illustrative embodiments provide a virtual container storage interface driver, which provides generic storage facilities that are selected by the attributes of the storage desired such as, by way of example only, class of service, types of data protection, storage interconnect fabric, and type of storage (e.g., block, file, or object). The virtual container storage interface driver provides a virtualization of the physical storage type that can be remapped while the storage is in use, facilitating migration or copying across different storage platforms.

Advantageously, existing storage array specific CSI and COSI drivers are able to plug into the virtual container storage interface driver allowing provisioning of block, file, or object storage using any underlying storage arrays utilizing proxy CSI or COSI drivers and enabling a wide variety of use cases across storage array boundaries. As a result, any mobility across a wide variety of storage platforms can be performed without the need to reconfigure the applications.

Additionally or alternatively, the virtual container storage interface driver allows other types of storage to be plugged in such as, by way of example, cloud platforms, thus facilitating use cases for migration of an application using cloud-based block storage or cloud-based object storage to equivalent types of non-cloud storage.

As will be explained in further detail below, the virtual container storage interface driver, according to one or more illustrative embodiments, is configured to isolate pods and persistent volume claims (PVCs) from the actual storage used for them. In one or more illustrative embodiments, this is accomplished by using a generic storage class (SC) and persistent volume (PV) that can represent any driver. The volume handle in the persistent volume of the virtual container storage interface driver is a globally unique identifier (GUID), which can only be interpreted by the virtual container storage interface driver. Once a volume placement algorithm has been completed (that can select from all of the available drivers), storage can be provisioned by a specific CSI driver and array. However the persistent volume and storage class that are used by the application are not immutably bound to a specific driver or volume.

Figure 3:
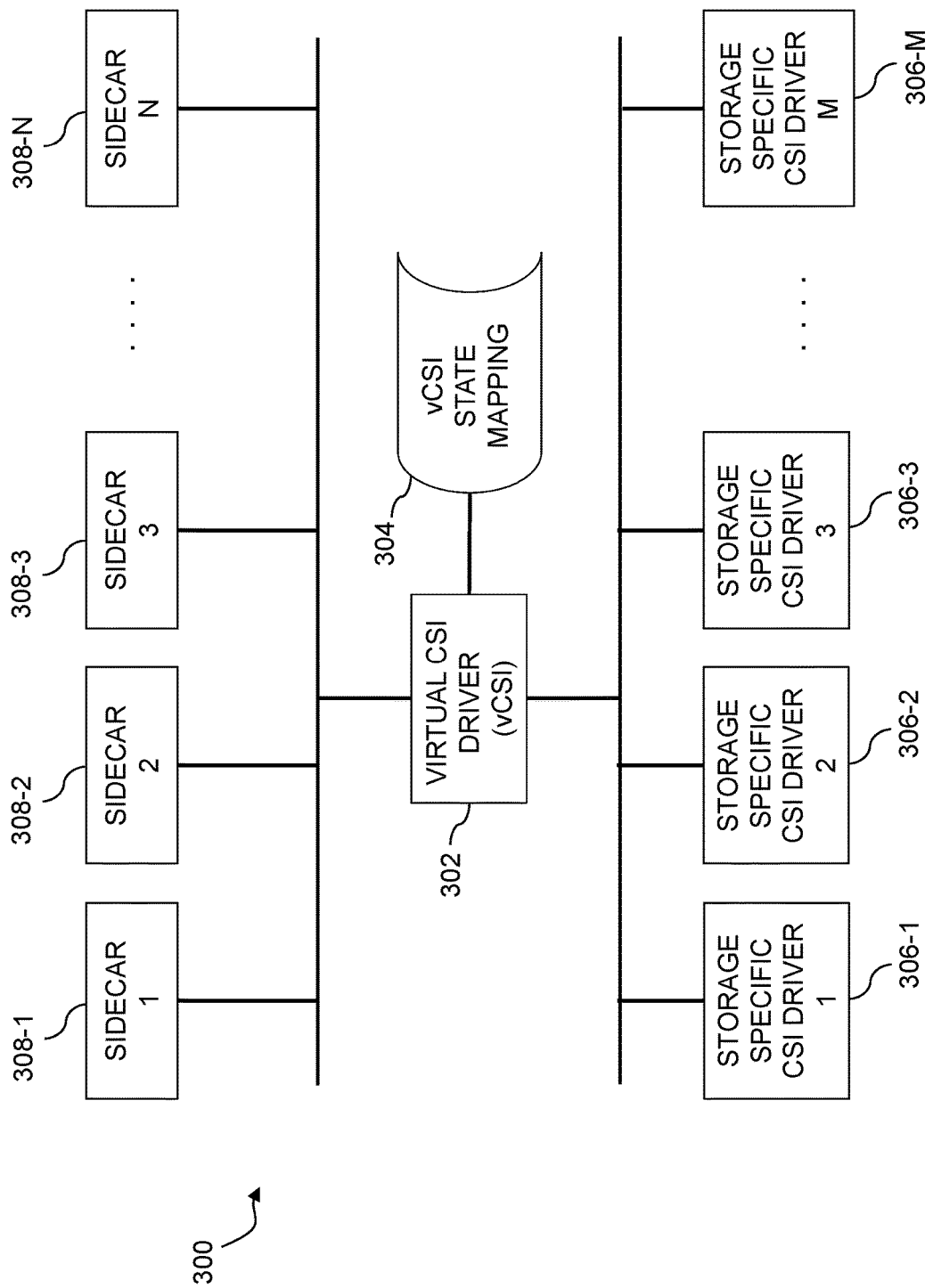
FIG. 3 illustrates a virtual container storage interface driver architecture according to an illustrative embodiment.

Referring now to FIG. 3, a virtual container storage interface driver architecture 300 is conceptually illustrated according to an illustrative embodiment. As shown, virtual container storage interface driver architecture 300 comprises a virtual container storage interface driver referred to as a virtual CSI driver (vCSI) 302 operatively coupled to a vCSI state mapping 304 and between a plurality of storage specific CSI drivers 306-1, 306-2, 306-3, . . . , 306-M (herein each individually referred to as storage specific CSI driver 306 or collectively as storage specific CSI drivers 306) and a plurality of sidecars 308-1, 308-2, 308-3, . . . , 308-N (herein each individually referred to as sidecar 308 or collectively as sidecars 308). As will be further explained, vCSI state mapping 304 relates vCSI driver 302 to actual and aspirational physical storage.

Storage specific CSI drivers 306 can comprise CSI drivers for a storage vendor's family of storage platforms, e.g., for Dell Technologies, where there can be a storage specific CSI driver 306 for each of their storage platforms including, but not limited to, PowerFlex, PowerMax, PowerScale, PowerStore, as well as others. Additionally or alternatively, storage specific CSI drivers 306 can comprise CSI drivers for cloud-based storage platforms including, but not limited to, block, file or object storage from Amazon Web Services (AWS), Google Cloud Platform (GCP), and Microsoft Azure.

Sidecars 308 can comprise Kubernetes supplied sidecar containers such as, but not limited to, an external-provisioner sidecar, an external-attacher sidecar, an external-snapshotter sidecar, and an external resizer sidecar. Additionally or alternatively, sidecars 308 can comprise storage vendor specific sidecars such as, but not limited to, a replicator sidecar and a pod management sidecar.

In general, and as will be further illustrated below, vCSI driver 302 is configured to translate individual requests between storage specific CSI drivers 306 and sidecars 308 for a wide variety of use cases. One functional goal of vCSI driver 302 is to facilitate use cases that are difficult to achieve with the current PV and SC models, because the PV object is generally immutable. One notable exception to PV immutability is the storage class field as it can be changed after a volume is provisioned with no apparent effect.

Some exemplary use cases comprise: (i) enabling or disabling replication transparently to an application while it is running with no impact to the application; (ii) enabling a non-disruptive migration from one storage array to another, which can be used to move workloads from storage arrays that are being retired to new ones, or to move workloads to a storage array with higher capacity or better performance, or that has a higher bandwidth or lower latency connection to the application; (iii) allowing intelligent volume placement to choose from storage arrays of different types; (iv) allowing cross storage array family snapshot shipping if supported by hardware (heterogeneous snapshot shipping); and (v) allowing cross storage array family replication (heterogeneous replication). Illustrative embodiments may be implemented in a combination of one or more of the above use cases, as well as one or more alternative use cases not specifically mentioned.

According to one or more illustrative embodiments, a persistent volume (PV) of vCSI driver 302 includes state information about the current storage array volume that it represents, called the "actual state." Additionally, to facilitate non-disruptive migration as an example, the PV of vCSI driver 302 may contain an "aspirational state," which represents information about the underlying storage array volume to which it is in the process of transitioning. The mapping of actual state and aspirational state to actual storage array volumes, which is embodied by vCSI state mapping 304, can be implemented as one of a variety of mapping mechanisms.

In one state mapping mechanism, storage array parameters, such as storage system ID, volume ID, storage pool, replication group, and the like, are managed as annotations on the PV with a copy for the actual state and another copy for the aspirational state. By way of example, annotation keys may comprise: (i) storageSystem.actual.storage.dell.com contains the storage system ID for the actual storage system in use; (ii) volume.actual.storage.dell.com contains the volume ID for the actual volume in use; (iii) storageSystem.aspirational.storage.dell.com contains the aspirational storage system ID; and (iv) volume.aspirational.storage.dell.com contains the aspirational volume ID.

In another state mapping mechanism, the vCSI volume handle GUID represents a key to a database that retrieves the actual and aspirational states of the volume. In such a case, the database can be stored on one or more of the storage arrays that are being managed, and can be a commercially available key-value database such as, by way of example only, etcd, Redis, BoltDB, or ArrangoDB.

In yet another state mapping mechanism, a Kubernetes vCSI custom resource is defined and named using the volume handle of the vCSI PV that contains the actual and aspirational volume information.

In a further state mapping mechanism, a combination of certain of the above mechanisms comprises representing the actual and aspirational states both as PV annotations, and in a key-value database stored on one or more of the storage arrays, thus providing redundancy in case one of the mapping copies is lost.

Another advantage to the introduction of vCSI driver 302 is that only one set of CSI sidecars are required at the vCSI level. That is, one set of sidecars 308 can be used to accommodate requests from all of the storage specific CSI drivers 306. This makes deployment simpler and saves memory space when supporting multiple storage array types with separate drivers, as each separate driver has its own contingent of sidecars.

The vCSI driver 302 functions as a shim layer that resides functionally between the Kubernetes CSI interfaces as expressed by PVCs, PVs, and StorageClasses (SCs), and an actual CSI driver. This layer allows a generic PV and SC to be used that can be mapped and/or remapped to a driver specific PV and SC. The application's PVC is bound to the vCSI PV. This PV has a volume annotation that uniquely identifies a volume's configuration. The vCSI state mapping 304 associated with vCSI driver 302 has a mutable mapping from the vCSI PV to the storage array volume, and possibly an additional mapping to an aspirational volume configuration.

The aspirational mapping is not used when the volume's configuration is not being changed. When a configuration change is desired, the aspirational mapping is set to the desired future state of the volume. For a period of time, the vCSI driver 302 orchestrates changes considering both the current state of a volume, and the desired future state, for example, when a non-disruptive migration is in progress. When the aspirational state has been achieved, vCSI driver 302 replaces the actual state of the volume, and the aspirational state is cleared, since the transition to a new state has completed.

Illustrative operations of vCSI driver 302 will now be described in the context of a non-disruptive volume migration use case across two storage arrays with different storage interfaces and semantics in conjunction with FIGS. 4A-4E. There are several reasons why a storage system or Kubernetes administrators might want to move a running volume (volume used by an application) from one storage array to a different storage array. For example, the storage array currently holding the volume is being decommissioned and it is desired to move all active volumes on that storage array to newer storage arrays. Second, the storage array currently holding the volume is overloaded in either performance or capacity, and some of its load needs to be moved elsewhere for higher performance or larger capacity. Third, the storage array currently holding the volume is expensive, and it is desired to move an application's volumes to less expensive volumes (possibly with lower performance).

Vendor families of storage platforms (e.g., Dell Technologies Power family of storage platforms as illustratively mentioned above) can be adapted to support non-disruptive migration across storage arrays and even across storage arrays of different types in some cases, for purposes of consolidating old storage arrays into a new storage arrays. As used here, non-disruptive means that the application can continue to execute while the migration operation is in progress and after it finishes, because the hardware will migrate the World Wide Names (WWNs), or maybe a universal WWN, from the old array to the new array, and the driver will have to update the available paths to the multipath driver. As is known, a WWN is a unique identifier that is hard-coded into each storage device by the device's manufacturer and provides a method for uniquely identifying storage devices across a network.

However, such non-disruptive volume migration cannot be handled without vCSI driver 302. To do this, the vCSI PV has to be updated with an aspirational state for the target storage array, including storage system ID, volume ID, storage class, and other information as may be desired. The vCSI driver 302 processes the updated PV, calling new csi-extensions to facilitate the non-disruptive migration. At the conclusion of the operation, the actual state is replaced by the aspirational state, and the aspirational state is cleared.

For example, the Kubernetes administrator can initiate the non-disruptive migration in multiple ways: (i) by editing the PV and updating the SC to one specifying that the volume should be on the target storage array; or (ii) creating a vendor specific migrate volume(s) custom resource that specifies the PVs to be updated and the desired new SC (which in turn specifies the target storage array). Then, the steps for a non-disruptive migration are as follows.

The vCSI driver 302 listens for PV updates that specify a new SC, or for creation of a migrate volumes custom resource. This indicates the Kubernetes administrator's desire to migrate the volumes. The PVs are updated with aspirational state information. The existence of an aspirational state in a PV indicates the volume is transitioning from its existing state (on the source storage array and volume) to a new state (on the destination or target storage array and volume). The Kubernetes system verifies host(s) connectivity (e.g., host device 202) to the target storage array which can be connected, for example, via Transmission Control Protocol (TCP) (e.g., iSCSI or NVMe/TCP) or via Fibre Channel (FC) (i.e., SCSI over FC). The target storage array (e.g., one of storage arrays 205) should be correctly paired with the source storage array (e.g., another one of storage arrays 205). The connectivity between the source storage array and the target storage array should also be verified. Connectivity between the target storage array and the source storage array can be either SCSI or NVMe, and both SCSI and NVMe can be over either TCP or FC transports. However, it is to be appreciated that the connectivity between host and storage arrays, and between storage arrays, can be one or more of the above mentioned or any other suitable connectivity option. Illustrative embodiments are not limited to any specific connectivity options.

The target storage array's CSI driver (e.g., storage specific CSI driver 306) is invoked to create an import session. This step causes the host to perform a path flip to the target storage array. After this point, reads and writes are processed by the target storage array, which retrieves any existing data not already copied to the target storage from the source storage array. Additionally, the data from the source volumes is copied in the background to the target storage array.

Host operation continues during the period that the source storage array's data is migrating to the target storage array. The host writes are directed to the target storage array, which copies them to the source storage array (in case a rollback is required.) The host reads local data on the target storage array if already copied, or the target storage array retrieves the information from the source storage array and forwards it to the host if the data has not already been copied to the host.

When all the data from the source volumes has been migrated to the target storage array, the target storage array's CSI driver initiates a cutover operation, which directs the host to remove paths to the source storage array and breaks the import session on the target storage array. After the cutover is completed, no rollback is possible, and the migration is complete.

Then, vCSI driver 302 updates the PV actual state to contain the target storage array ID, target volume ID(s), and other information from the aspirational state information. The aspirational system information is cleared, indicating the transition to the new storage array has been completed.

Existing storage system implementation (without vCSI) can perform volume migration but, due to the lack of vCSI's mapping ability, the PV is left in a state where its attributes are not consistent with the migrated state. To correct this situation, the PV must be replaced and rebound to the PVC that is using it. This normally requires a restart of the pod(s) using the volume, causing the application to have a short disruption.

FIGS. 4A-4E illustrate a non-disruptive volume migration use case according to an illustrative embodiment. As collectively shown, migration of a persistent storage volume is performed from a source array to a target or destination array under the control of a vCSI controller 400. It is to be understood that vCSI controller 400 is configured to implement vCSI driver 302 and vCSI state mapping 304 to provide the above-described shim layer between the storage specific CSI drivers 306 of array 1 and array 2 and any sidecars 308 needed to effectuate the migration.

Figure 4A:
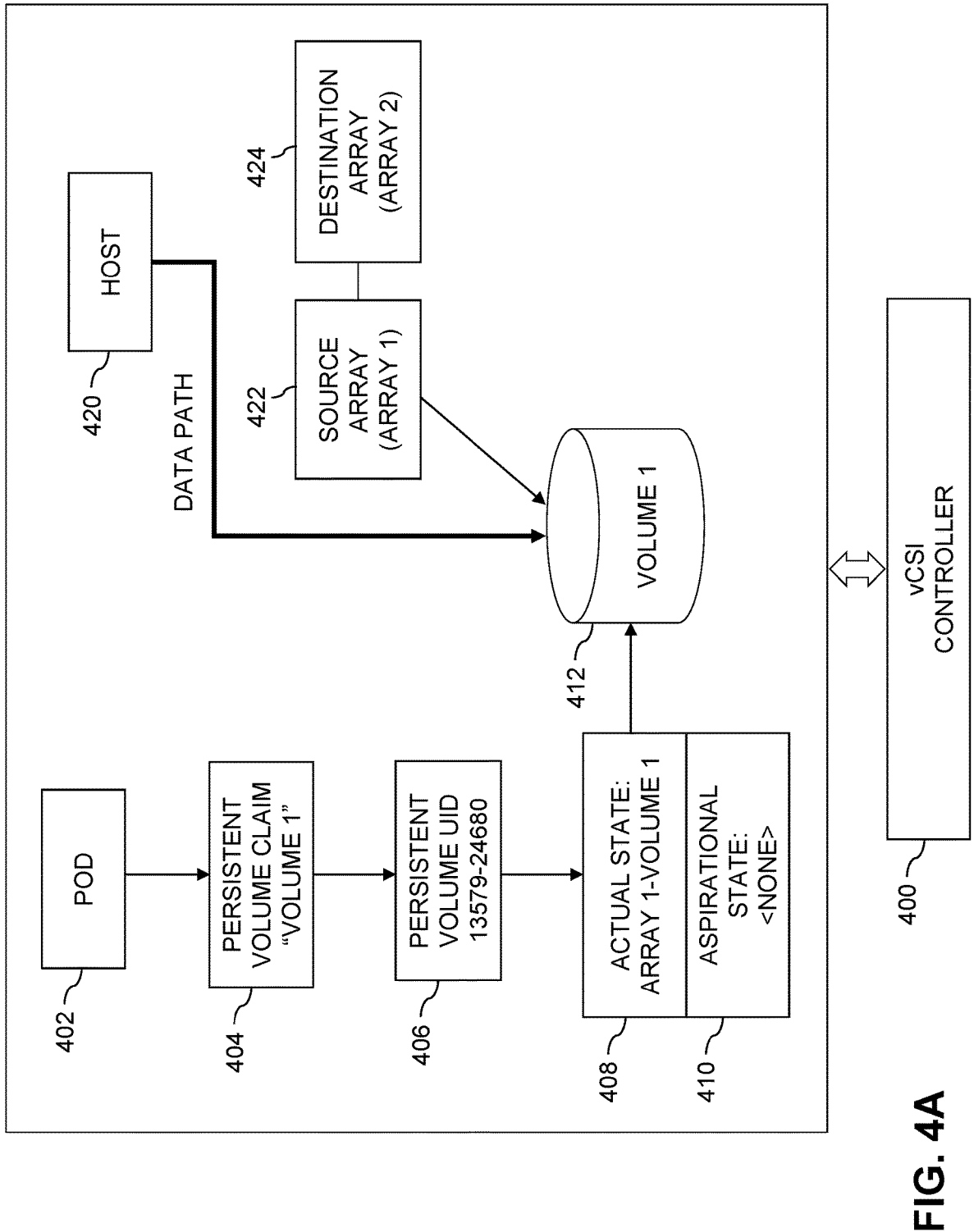
FIGS. 4A through 4E illustrate a virtual container storage interface driver methodology according to an illustrative embodiment.

As shown in FIG. 4A, for a given pod 402, assume that a persistent volume claim (PVC) 404 exists for a persistent volume (PV) which is identified as volume 1 (412) and has a universal ID 406 as specified. Assume that volume 1 is initially provisioned by vCSI controller 400 on a source array 422 (array 1) and accessed by a host 420. The vCSI actual state 408 corresponds to the volume's array ID and identity on that array (array 1-volume 1). Aspirational state 410 has no value yet.

Figure 4B:
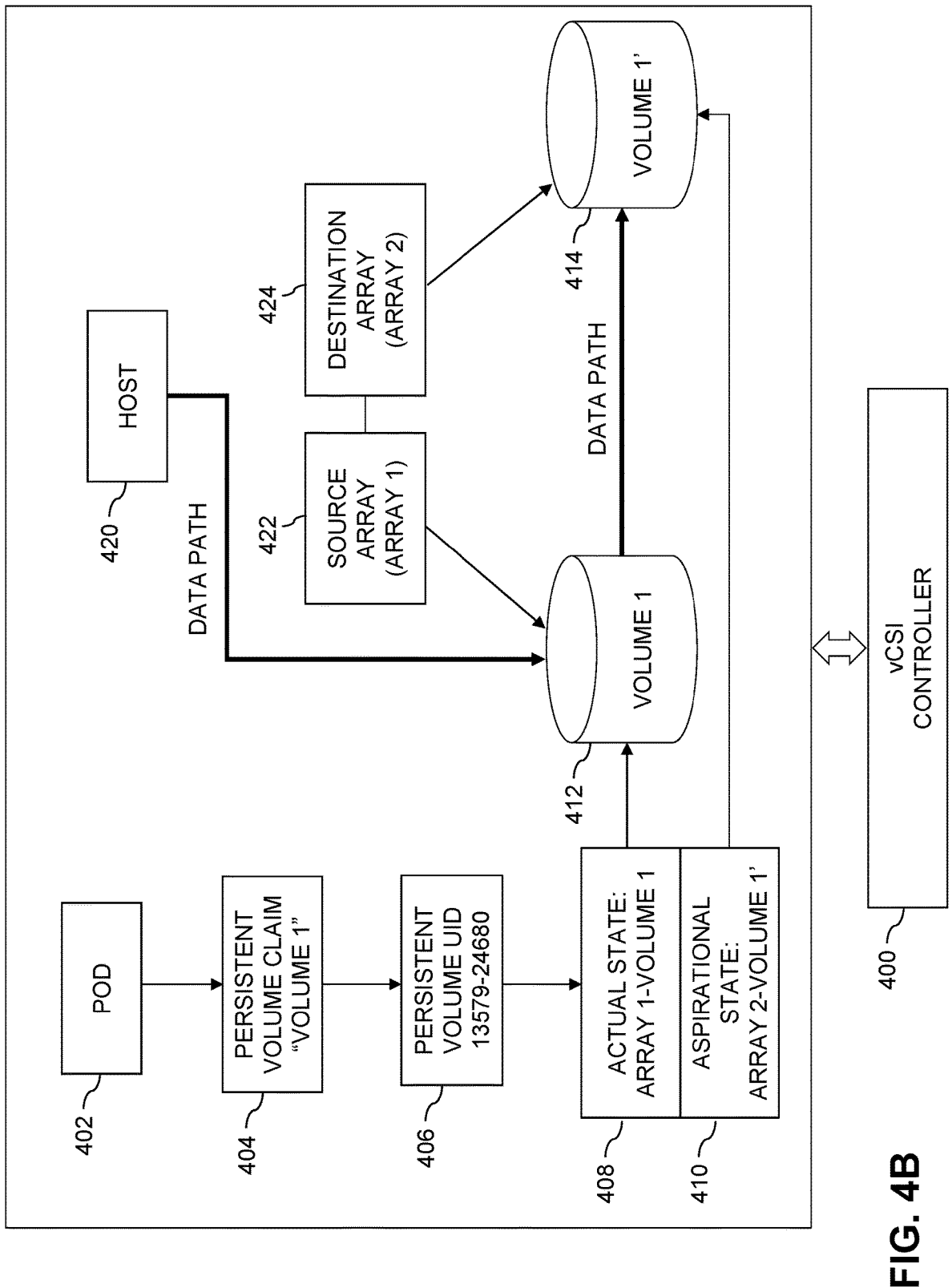

Now assume that volume 1 is to be migrated from source array 422 (array 1) to a destination array 424 (array 2). Note that source array 422 and destination array 424 can be two different storage platforms (e.g., different interfaces and semantics) available from a given storage vendor or from two different storage vendors. To set up staging for migration of volume 1 (412) to destination array 424, as shown in FIG. 4B, an empty volume 1' (414) is created on destination array 424 to receive the data and a data path is setup to allow copying of the data from the original volume 1 to volume 1'. Note that aspirational state 410 now corresponds to the volume's array ID and identity on that array (array 2-volume 1').

Figure 4C:
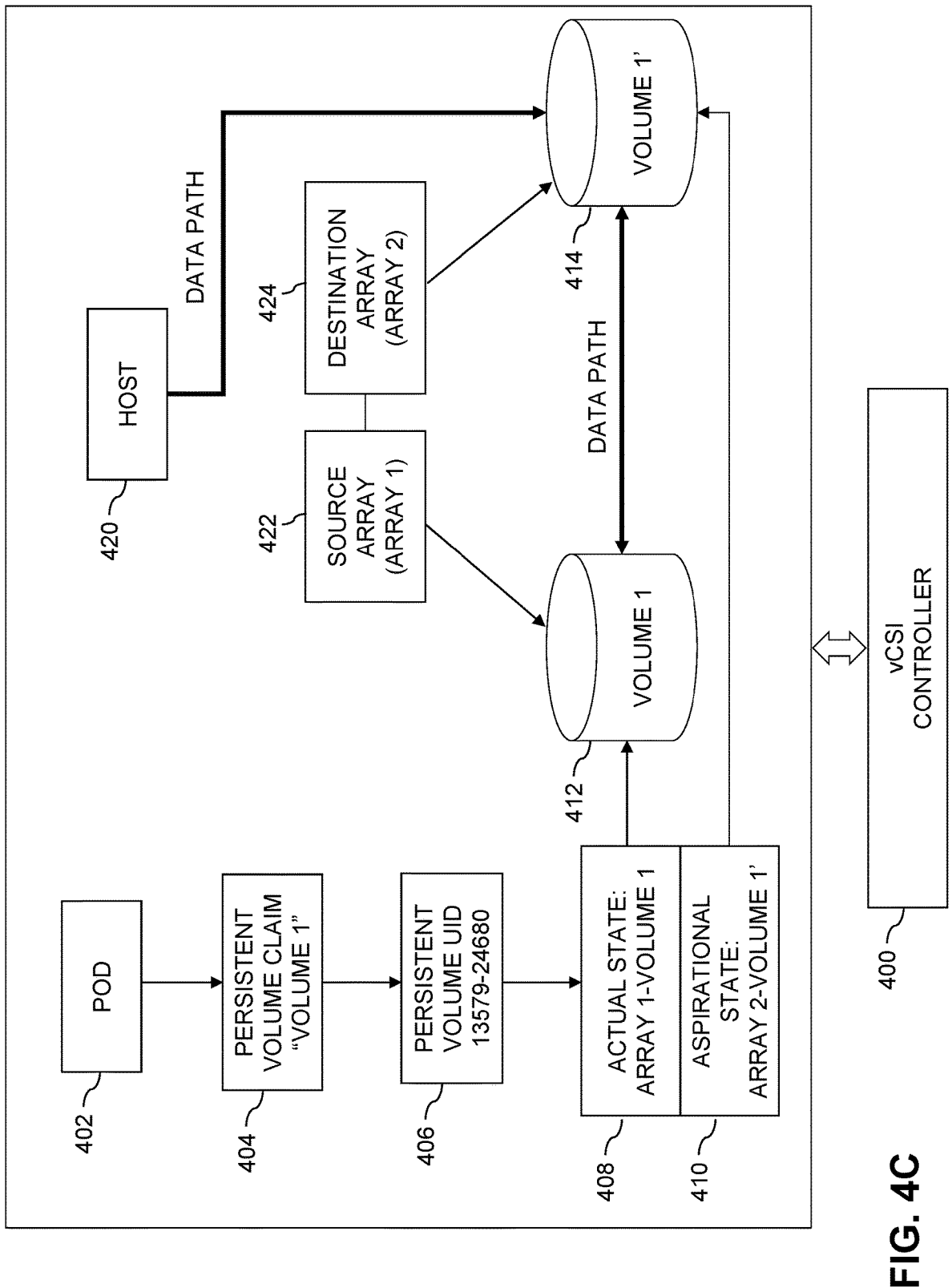

As shown in FIG. 4C, once the array-to-array data path has been established, to initiate migration, host 420 access is switched to the new volume 1' (414). Writes are stored there and written back to volume 1 (412) in case it is necessary to revert. Reads are satisfied from volume 1' (414) if possible, but if not, the data is forwarded over the array-to-array data path from volume 1 (412) to volume 1' (414).

Figure 4D:
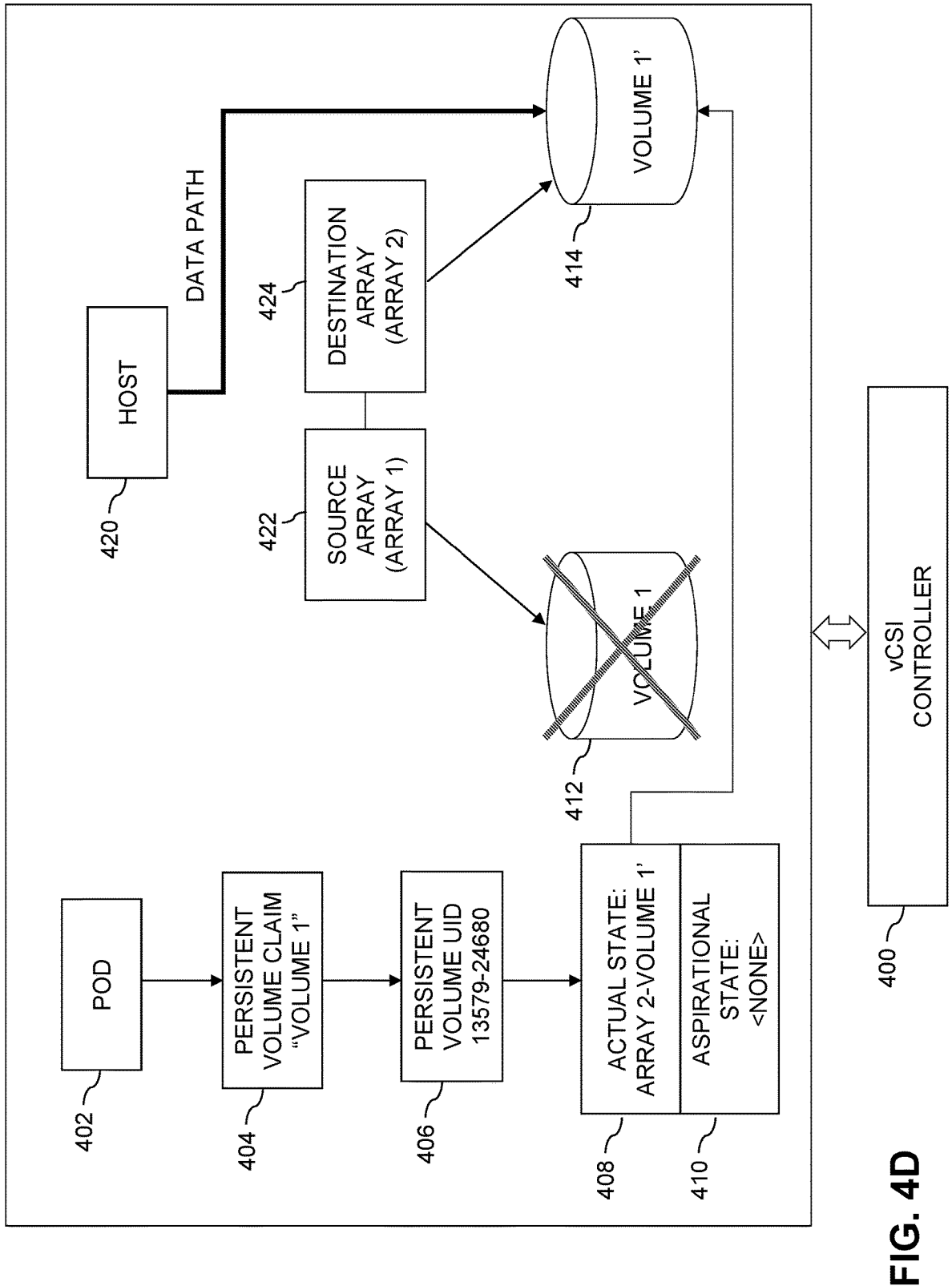

When the migration has completed, as shown in FIG. 4D, the array-to-array data path can be torn down, and the vCSI controller 400 updates its vCSI actual state 408 to the new volume 1' (array 2-volume 1'). There is no longer any aspirational state 410 as there is no longer a pending change to the volume. The original volume 1 (412) is deleted at this point as it is no longer in use.

Figure 4E:
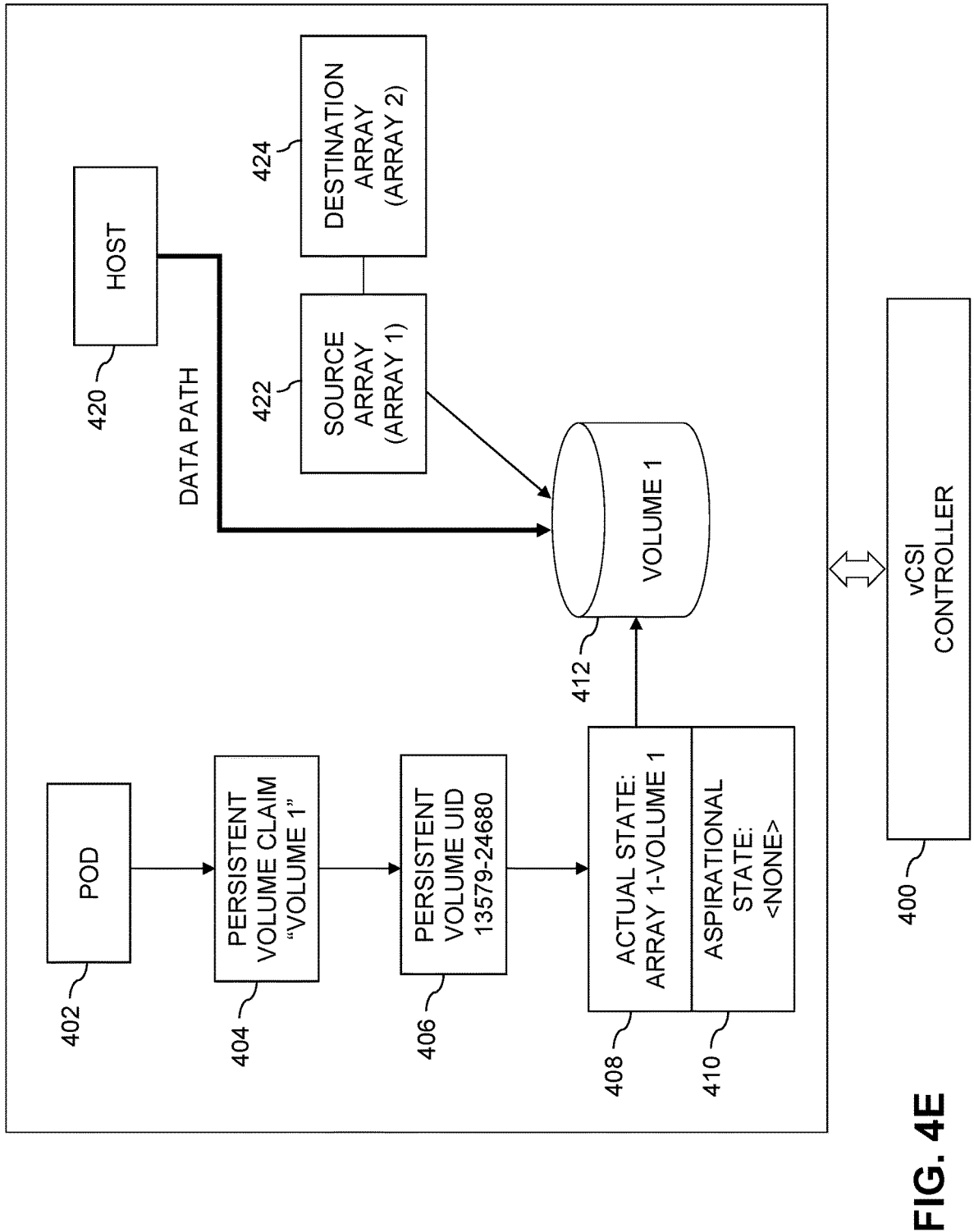

Lastly, as shown in FIG. 4E, if for some reason the migration fails, then the array-to-array data path is torn down, and the aspirational copy of the data on volume 1' (414) is deleted. The aspirational state 410 is cleared, as there is no longer any pending change to volume 1 (412).

While a non-disruptive volume migration use case is described above in FIGS. 4A-4E, it is to be understood that vCSI controller 400 is configured to manage a variety of other use cases in a straightforward manner.

For example, consider an intelligent volume placement use case. To allow initial provisioning of a persistent storage volume, vCSI controller 400 can intelligently choose the type of storage array best suited to an application. In one or more illustrative embodiments, this can be accomplished by utilizing a generic storage class that specifies only class of service attributes that could be interpreted across different array types. By way of example, these class of service attributes may comprise: (i) required volume performance expressed in terms of desired input-output operations per second (TOPS) or host read-write bandwidth; (ii) facilities required for data protection (e.g., replication to a given target array); (iii) features that can be array specific such as deduplication, compression, thin or thick volumes, and the like; (iv) preferred host transport protocol (e.g., NVME/TCP, FC, iSCSI, NFS, SMB/CIFS).

The vCSI controller 400 generates a create volume call that reacts to this by determining the available storage arrays, and their available storage pools, and matching the class of service attributes against the storage arrays, storage pools, and available capacities available on all arrays, picking the best array and pool based on all the supplied attributes. The selection is provisioned as the vCSI actual state 408 in the persistent volume since it is an initial creation.

If later, a class of service change is desired, it can be handled in a similar manner to volume migration, by updating the storage class with different class of service parameters in the aspirational state 410, and leaving a blank storage system selection in the storage class so that the system would select a new appropriate storage system. Only target storage arrays that could support non-disruptive migration would be selected for updating the storage class, as changing the class of service in a way that places the volume on a new storage system would implicitly require a non-disruptive migration.

Furthermore, vCSI controller 400 can be configured to dynamically enable or disable replication. In such a use case, a new storage class name is supplied that matches aspirational state 410, either adding replication parameters, or removing existing replication parameters. Cross family replication can also be implemented in a straightforward manner.

Advantageously, as described herein, illustrative embodiments provide technical solutions to help with mobility and volume placement services, which are not array specific. For example, illustrative embodiments enable seamless movement of workloads across different storage arrays within a given storage platform portfolio without application disruption. In a multi-cloud environment, illustrative embodiments provide an efficient way to avoid application reconfiguration, each time the underlying storage is changed or updated. Also, because there is a single vCSI driver representing all storage platforms, only one set of sidecars (e.g., provisioner, attacher, snapshotter, resiliency, migration, replication, etc.) are required, rather than one set for each physical array type that is used. This results in a reduced memory footprint on the Kubernetes control plane nodes. Further, in accordance with illustrative embodiments, application developers do not need to consider the specific capabilities or limitations of each type of storage array. Instead, they delegate the choice of storage array type, and characteristics to an intelligent agent (i.e., vCSI controller 400) that uses the storage application requirements, such as performance and redundancy requirements, to make the best selection among available storage types. Still further, applications can be non-disruptively migrated to different underlying storage arrays based on changing available capacities, priorities, or required storage characteristics.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for a virtual container storage interface driver will now be described in greater detail with reference to FIGS. 5 and 6. Although described in the context of systems and processes of FIGS. 1-4E, these platforms may also be used to implement at least portions of other information processing systems in other embodiments.

Figure 5:
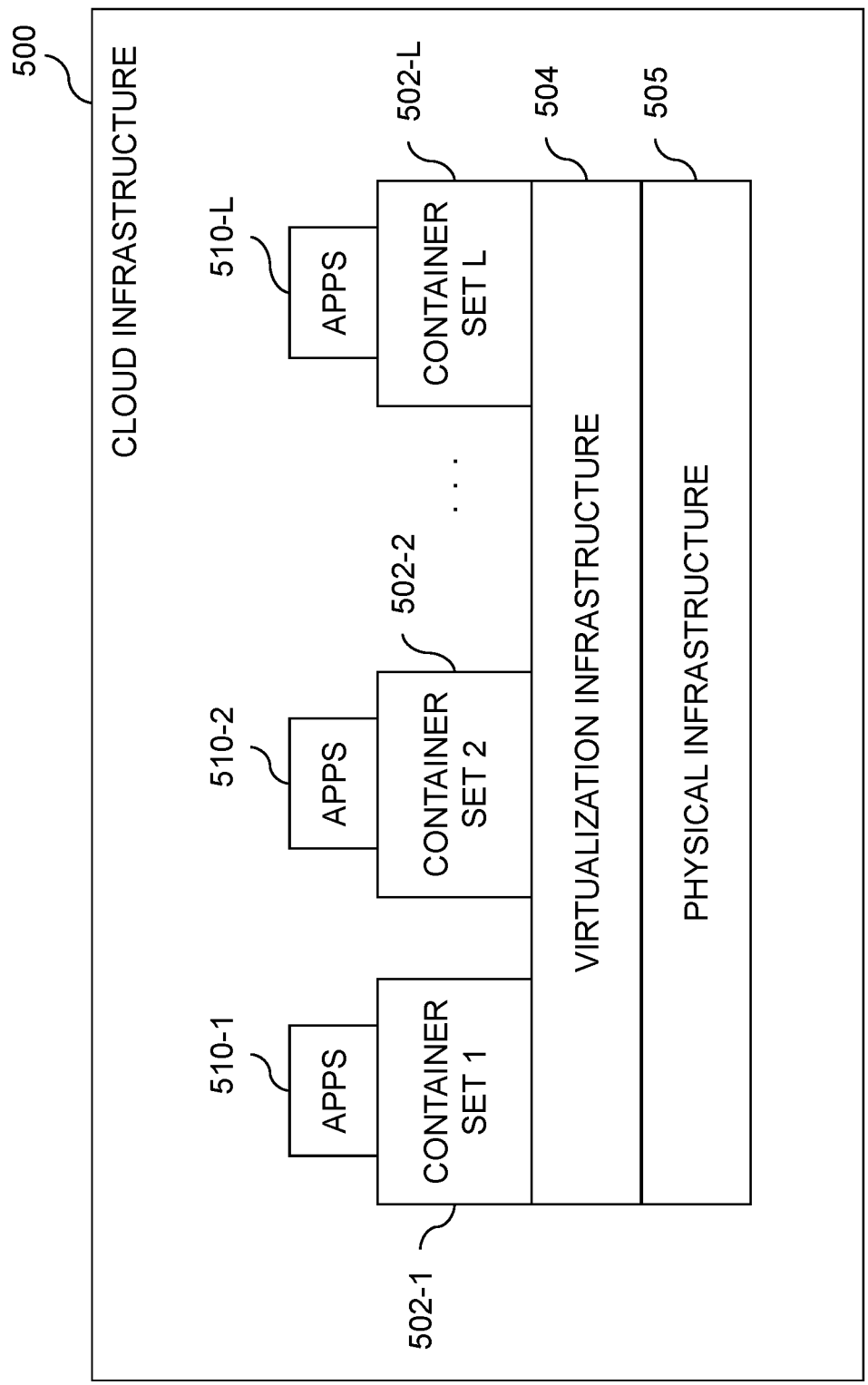

FIG. 5 shows an example processing platform comprising cloud infrastructure 500. The cloud infrastructure 500 comprises a combination of physical and virtual processing resources that may be utilized to implement at least a portion of the environments and systems described herein (e.g., 100/200). The cloud infrastructure 500 comprises multiple container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure.

The cloud infrastructure 500 further comprises sets of applications 510-1, 510-2, . . . 510-L running on respective ones of the container sets 502-1, 502-2, . . . 502-L under the control of the virtualization infrastructure 504. The container sets 502 may comprise respective sets of one or more containers.

In some implementations of the FIG. 5 embodiment, the container sets 502 comprise respective containers implemented using virtualization infrastructure 504 that provides operating system level virtualization functionality, such as support for Kubernetes-managed containers.

As is apparent from the above, one or more of the processing modules or other components of environments and systems 100/200 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of environments and systems 100/200 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and systems and processes of FIGS. 1-4E may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality as disclosed herein are illustratively implemented in the form of software running on one or more processing devices.

The particular processing operations and other system functionality described in conjunction with the diagrams described herein are presented by way of illustrative example only, and should not be construed as limiting the scope of the disclosure in any way. Alternative embodiments can use other types of processing operations and protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the above-described embodiments are presented for purposes of illustration only. Many variations and other alternative embodiments may be used. For example, the disclosed techniques are applicable to a wide variety of other types of information processing systems, host devices, storage systems, container monitoring tools, container management or orchestration systems, container metrics, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
    at least one processing platform comprising at least one processor coupled to at least one memory, the at least one processing platform, when executing program code, is configured to implement a virtual container storage interface controller configured to implement a virtual container storage interface driver operatively coupled to and disposed between a set of storage specific container storage interface drivers and a shared set of sidecar containers, wherein the virtual container storage interface controller is configured to:
    manage, via the virtual container storage interface driver, a generic mapping for one or more container storage attributes for the set of storage specific container storage interface drivers which are respectively associated with a set of storage arrays of a storage system so as to isolate an application program, executing on a host device accessing one or more storage volumes stored on the set of storage arrays, from the set of storage specific container storage interface drivers, wherein at least one of the storage arrays of the set of storage arrays has at least one of a different interface, different semantics, a different data type, a different storage product, and a different storage vendor than at least another one of the storage arrays of the set of storage arrays; and
    translate, via the virtual container storage interface driver, individual requests between the set of storage specific container storage interface drivers and the shared set of sidecar containers so that the shared set of sidecars are enabled to process the individual requests from the set of storage specific container storage interface drivers.

2. The apparatus of claim 1, wherein the virtual container storage interface controller is further configured to utilize the generic mapping to cause migration of a given one of the one or more storage volumes from a first one of the set of storage arrays to a second one of the set of storage arrays while the application program continues to execute on the host device.

3. The apparatus of claim 2, wherein the one or more container storage attributes comprise a persistent volume attribute specifying an actual state and an aspirational state, wherein the actual state corresponds to the first one of the set of storage arrays and the aspirational state corresponds to the second one of the set of storage arrays.

4. The apparatus of claim 3, wherein the actual state comprises an identifier for the first one of the set of storage arrays and an identity of the given one of the one or more storage volumes stored thereon.

5. The apparatus of claim 4, wherein the aspirational state comprises an identifier for the second one of the set of storage arrays and an identity of the given one of the one or more storage volumes being migrated to the second one of the set of storage arrays for storage thereon.

6. The apparatus of claim 5, wherein the virtual container storage interface controller is further configured to cause setup of a data path between the first one of the set of storage arrays and the second one of the set of storage arrays to enable copying of data from the given one of the one or more storage volumes from the first one of the set of storage arrays to the second one of the set of storage arrays.

7. The apparatus of claim 6, wherein the virtual container storage interface controller is further configured to cause switching the data path of the host device from the first one of the set of storage arrays to the second one of the set of storage arrays.

8. The apparatus of claim 7, wherein the virtual container storage interface controller is further configured to change the actual state to the identifier for the second one of the set of storage arrays and the identity of the given one of the one or more storage volumes migrated to the second one of the set of storage arrays and stored thereon.

9. The apparatus of claim 8, wherein the virtual container storage interface controller is further configured to cause tear down of the data path between the first one of the set of storage arrays and the second one of the set of storage arrays.

10. The apparatus of claim 1, wherein the virtual container storage interface controller is further configured to utilize the generic mapping to cause initial placement of an additional storage volume on a given one of the set of storage arrays.

11. The apparatus of claim 10, wherein the one or more container storage attributes comprise a storage class attribute specifying a class of service attributes for selecting the given one of the set of storage arrays on which the additional storage volume will be initially placed.

12. The apparatus of claim 1, wherein the virtual container storage interface controller is further configured to utilize the generic mapping to cause replication of at least a portion of the one or more storage volumes from a first one of the set of storage arrays to a second one of the set of storage arrays.

13. The apparatus of claim 12, wherein the one or more container storage attributes comprise a storage class attribute specifying a class of service attributes for selecting the second one of the set of storage arrays on which the portion of the one or more storage volumes will be replicated.

14. The apparatus of claim 1, wherein the virtual container storage interface controller is further configured to operate in a pod-based environment.

15. A method comprising:
    implementing a virtual container storage interface controller configured to implement a virtual container storage interface driver operatively coupled to and disposed between a set of storage specific container storage interface drivers and a shared set of sidecar containers;
    managing, via the virtual container storage interface driver, a generic mapping for one or more container storage attributes for the set of storage specific container storage interface drivers respectively associated with a set of storage arrays of a storage system so as to isolate an application program, executing on a host device accessing one or more storage volumes stored on the set of storage arrays, from the set of storage specific container storage interface drivers, wherein at least one of the storage arrays of the set of storage arrays has at least one of a different interface, different semantics, a different data type, a different storage product, and a different storage vendor than at least another one of the storage arrays of the set of storage arrays; and translating, via the virtual container storage interface driver, individual requests between the set of storage specific container storage interface drivers and the shared set of sidecar containers so that the shared set of sidecars are enabled to process the individual requests from the set of storage specific container storage interface drivers;

wherein the virtual container storage interface controller is implemented on a processing platform comprising at least one processor, coupled to at least one memory, executing program code.

16. The method of claim 15, wherein the virtual container storage interface controller utilizes the generic mapping to cause migration of a given one of the one or more storage volumes from a first one of the set of storage arrays to a second one of the set of storage arrays while the application program continues to execute on the host device.

17. The method of claim 15, wherein the virtual container storage interface controller utilizes the generic mapping to cause initial placement of an additional storage volume on a given one of the set of storage arrays.

18. The method of claim 15, wherein the virtual container storage interface controller utilizes the generic mapping to cause replication of at least a portion of the one or more storage volumes from a first one of the set of storage arrays to a second one of the set of storage arrays.

19. The method of claim 18, wherein the one or more container storage attributes comprise a storage class attribute specifying a class of service attributes for selecting the second one of the set of storage arrays on which the portion of the one or more storage volumes will be replicated.

20. A computer program product comprising a non-transitory processor-readable storage medium having stored therein program code of one or more software programs, wherein the program code when executed by at least one processing platform causes the at least one processing platform to:

implement a virtual container storage interface controller configured to implement a virtual container storage interface driver operatively coupled to and disposed between a set of storage specific container storage interface drivers and a shared set of sidecar containers;

manage, via the virtual container storage interface driver, a generic mapping for one or more container storage attributes for a set of storage specific container storage interface drivers respectively associated with the set of storage arrays of a storage system so as to isolate an application program, executing on a host device accessing one or more storage volumes stored on the set of storage arrays, from the set of storage specific container storage interface drivers, wherein at least one of the storage arrays of the set of storage arrays has at least one of a different interface, different semantics, a different data type, a different storage product, and a different storage vendor than at least another one of the storage arrays of the set of storage arrays; and translate, via the virtual container storage interface driver, individual requests between the set of storage specific container storage interface drivers and the shared set of sidecar containers so that the shared set of sidecars are enabled to process the individual requests from the set of storage specific container storage interface drivers.

* * * * *